US012667039B2

(12) United States Patent
Schoeny et al.

(10) Patent No.: US 12,667,039 B2
(45) Date of Patent: Jun. 30, 2026

(54) FAULT DETECTION BY ANALYSIS OF COUPLED PRESSURE AND DEPTH FOR GROUND-ENGAGING COMPONENTS

(71) Applicant: CNH Industrial America LLC, New Holland, PA (US)

(72) Inventors: Christopher Schoeny, Minooka, IL (US); Trevor Philip Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 637 days.

(21) Appl. No.: 18/084,017

(22) Filed: Dec. 19, 2022

(65) Prior Publication Data

US 2024/0196776 A1 Jun. 20, 2024

(51) Int. Cl.
| | |
|---|---|
| *A01B 63/22* | (2006.01) |
| *F15B 19/00* | (2006.01) |
| *G01L 19/00* | (2006.01) |
| *A01C 5/06* | (2006.01) |

(52) U.S. Cl.
CPC ............ *A01B 63/22* (2013.01); *F15B 19/005* (2013.01); *G01L 19/0092* (2013.01); *A01C 5/064* (2013.01)

(58) Field of Classification Search
CPC ... A01B 63/22; F15B 19/005; G01L 19/0092; A01C 5/064
USPC .......................................................... 701/50
See application file for complete search history.

(56) References Cited

U.S. PATENT DOCUMENTS

| | | | |
|---|---|---|---|
| 5,970,430 A | 10/1999 | Burns et al. | |
| 6,453,261 B2 | 9/2002 | Boger et al. | |
| 6,804,618 B2 | 10/2004 | Junk | |
| 7,251,935 B2 | 8/2007 | Zhang et al. | |
| 7,620,522 B2 | 11/2009 | Bredau et al. | |
| 7,726,665 B2 * | 6/2010 | Bitter ....................... | B66F 9/22 |
| | | | 180/41 |
| 9,222,242 B2 | 12/2015 | Yuan et al. | |

(Continued)

FOREIGN PATENT DOCUMENTS

WO 2020049214 A1 3/2020

OTHER PUBLICATIONS

Johnson, Jack, "Identifying errors in motion-control servoloops," Power & Motion, Aug. 10, 2006, retrieved at: https://www.hydraulicspneumatics.com/technologies/controls-instrumentation/article/21883332/identifying-errors-in-motioncontrol-servoloops, 9 pages.

*Primary Examiner* — Khoi H Tran
(74) *Attorney, Agent, or Firm* — Fletcher Yoder, P.C.

(57) ABSTRACT

A control system includes a position sensor configured to monitor a position of a piston associated with a fluid cylinder and a pressure sensor configured to monitor a fluid pressure inside the fluid cylinder. The control system includes a controller configured to receive signals from the position sensor and the pressure sensor to determine a position change and a pressure change during a certain period of time. The controller is configured to compare the position change to an expected position change associated with the pressure change and compare the pressure change to an expected pressure change associated with the position change. The controller is configured to identify a fault in response to determining the position change is not within a first threshold range of the expected position change, or determining the pressure change is not within a second (Continued)

threshold range of the expected pressure change, or a combination thereof.

20 Claims, 3 Drawing Sheets

(56)                    References Cited

U.S. PATENT DOCUMENTS

| | | | |
|---|---|---|---|
| 9,423,800 B2 | 8/2016 | Rannow | |
| 9,727,433 B2 | 8/2017 | Nousiainen | |
| 2013/0180742 A1* | 7/2013 | Wendte | A01B 63/1145 172/4 |
| 2014/0116735 A1* | 5/2014 | Bassett | A01C 7/203 172/430 |
| 2016/0165789 A1* | 6/2016 | Gervais | A01C 7/205 700/275 |
| 2018/0168094 A1* | 6/2018 | Koch | A01C 5/064 |
| 2019/0113910 A1 | 4/2019 | Wagner-Stuerz | |
| 2019/0178695 A1* | 6/2019 | Bittner | G01F 1/86 |
| 2019/0257327 A1* | 8/2019 | Chen | E02F 9/267 |
| 2019/0390691 A1 | 12/2019 | Friman et al. | |
| 2020/0196520 A1* | 6/2020 | Schoeny | A01C 21/00 |
| 2022/0346300 A1 | 11/2022 | Johnson et al. | |
| 2023/0200278 A1* | 6/2023 | Thompson | G01L 1/22 172/4 |
| 2023/0263085 A1* | 8/2023 | Fanshier | A01B 63/102 172/4 |
| 2023/0337564 A1* | 10/2023 | Larson | A01B 63/008 |

* cited by examiner

FAULT DETECTION BY ANALYSIS OF COUPLED PRESSURE AND DEPTH FOR GROUND-ENGAGING COMPONENTS

BACKGROUND

The present disclosure relates generally to fault detection by analysis of coupled pressure and depth for ground-engaging components.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes an opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing disc(s) that move displaced soil back into the trench and/or packer wheel(s) that pack the soil on top of the deposited seeds/ other agricultural products. Certain row units may also include residue management wheel(s) positioned in front of the opener and configured to break up and/or displace residue and debris (e.g., clods) on the soil surface.

Certain planting implements include a control system configured to control a force applied by the closing disc(s) to the soil and/or a force applied by the packer wheel(s) to the soil during operation of the planting implement, thereby establishing a desired soil profile behind the planted seeds/ other agricultural products. Additionally or alternatively, the control system may control a force applied by the residue management wheel(s) to enable the residue management wheel(s) to effectively break up/displace the residue. For example, the force applied by at least one ground-engaging tool (e.g., the closing disc(s), the packer wheel(s), the residue management wheel(s), or a combination thereof) to the soil may be controlled by respective air cylinder(s) in a pneumatic system, and the control system may control air pressure within the respective air cylinder(s). During operation, one or more ground engaging tools may be in an undesirable position and/or apply an undesirable force, and such a condition may not be detected, thereby resulting in less efficient planting operations.

SUMMARY OF THE INVENTION

In certain embodiments, a control system for an agricultural implement includes a position sensor configured to monitor a position of a piston associated with a fluid cylinder, and the fluid cylinder is configured to apply a force to a ground-engaging tool of the agricultural implement via the piston rod. The control system also includes a pressure sensor configured to monitor a fluid pressure inside the fluid cylinder. The control system includes a controller communicatively coupled to the position sensor and the pressure sensor. The controller includes a memory and a processor. The controller is configured to receive a position signal from the position sensor and a pressure signal from the pressure sensor. The controller is configured to determine a position change of the piston rod based on the position signal during a certain period of time, determine a pressure change of the fluid pressure inside the fluid cylinder based on the pressure signal during the certain period of time, compare the position change to an expected position change associated with the pressure change, and compare the pressure change to an expected pressure change associated with the position change. The controller is configured to identify a fault in response to determining the position change is not within a first threshold range of the expected position change, or determining the pressure change is not within a second threshold range of the expected pressure change, or a combination thereof.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
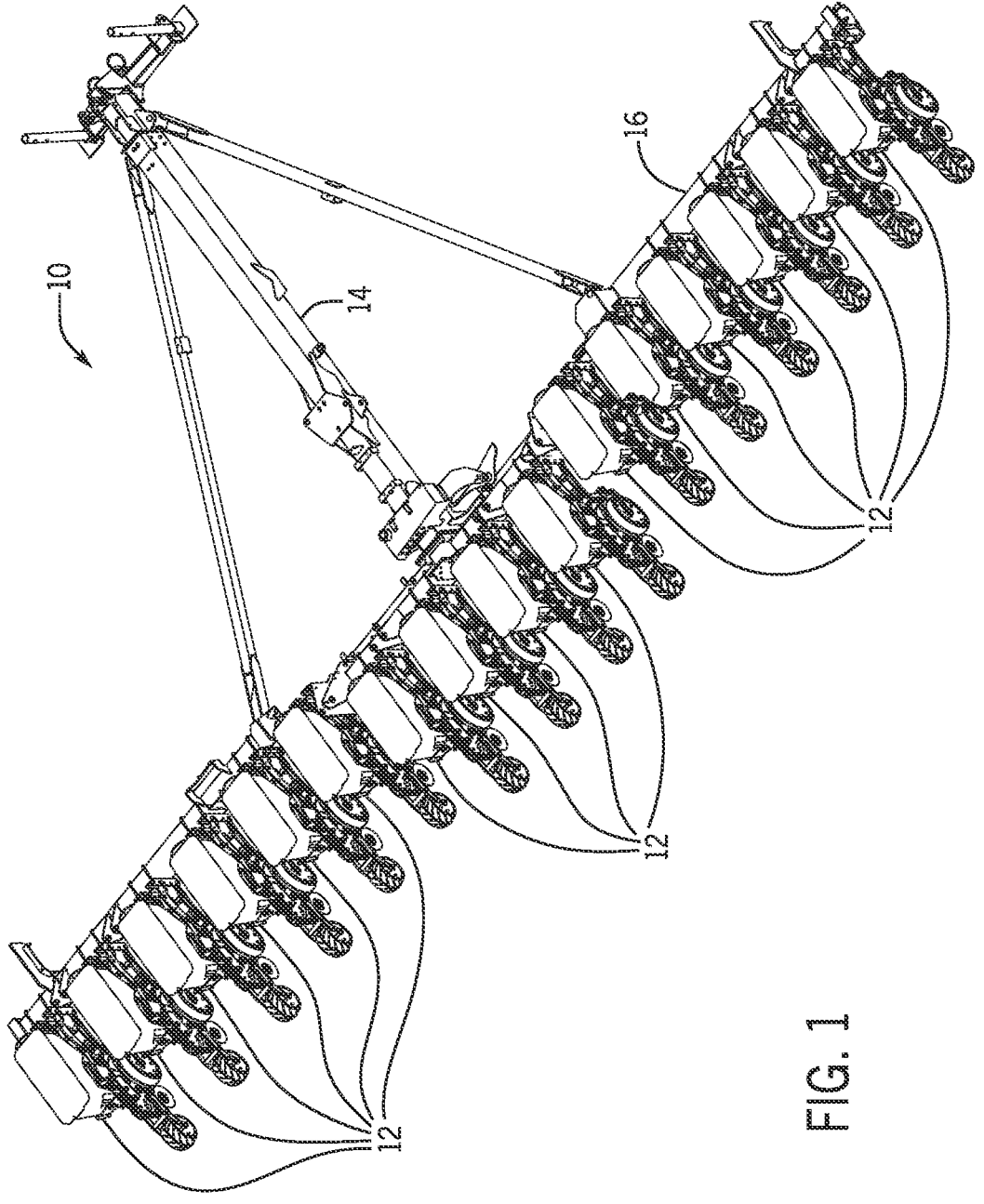
FIG. 1 is a perspective view of an embodiment of an agricultural implement having multiple row units distributed across a width of the agricultural implement.

FIG. 1 is a perspective view of an embodiment of an agricultural implement 10 (e.g., planting implement, planter) having multiple row units 12 (e.g., planter row units) distributed across a width of the agricultural implement 10. The agricultural implement 10 is configured to be towed through an agricultural field behind a work vehicle, such as a tractor. As illustrated, the agricultural implement 10 includes a tongue assembly 14, which includes a hitch configured to couple the agricultural implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and/or packer wheel(s) positioned behind the agricultural product conveying system. The closing disc(s) are configured to move displaced soil back into the seed path/trench, and the packer wheel(s) are configured to pack soil on top of the deposited seeds/other agricultural product(s). Additionally or alternatively, the row unit 12 may include residue management wheel(s) positioned in front of the opener discs and configured to break up and/or displace residue and debris (e.g., clods) on a surface of the soil.

In certain embodiments, the agricultural implement 10 includes a control system for a fluid cylinder (e.g., double-acting air cylinder, etc.) of the agricultural implement. The fluid cylinder is configured to apply a force (e.g., an up-force and/or a downforce) to a ground-engaging tool of the agricultural implement 10, such as the closing disc(s), the packer wheel(s), or the residue management wheel(s) of a respective row unit 12. The control system includes a valve assembly configured to control a fluid pressure within the fluid cylinder, thereby controlling the force applied by the fluid cylinder to the ground-engaging tool. In addition, the control system includes a controller communicatively coupled to the valve assembly and having a memory and a processor. The controller controls the valve assembly to control the fluid pressure within the fluid cylinder to control the force applied to the ground-engaging tool. The control system may include pressure sensors to monitor the fluid pressure inside the fluid cylinder to control the fluid pressure within the fluid cylinder and thus control the force applied to the ground-engaging tool. During operation, one or more ground engaging tools may be in an undesirable position and/or apply an undesirable force, and such a condition may not be detected, e.g., due to a pressure sensor working under undesirable position or undesirable force. Additionally or alternatively, the controller may control the valve assembly to control the fluid volume within at least one fluid cylinder to control the position of the ground-engaging tool. The control system may include one or more position sensor to monitor a position of a piston rod in the fluid cylinder. A change in the position of the piston rod may indicate a corresponding change in the fluid volume in the fluid cylinder, which may cause a pressure change of the fluid in the fluid cylinder. In addition, a change in the pressure of the fluid in the fluid cylinder may cause a position change of the piston rod in the fluid cylinder. Accordingly, when there is a disagreement between the position change of the piston rod in the fluid cylinder and the expected pressure change based on the position change, or when there is a disagreement between the pressure change of the fluid in the fluid cylinder and an expected position change of the piston rod in the fluid cylinder based on the pressure change, or a combination thereof, the control system may detect a fault. Based on the disagreement, a type of the fault (e.g., solenoid, actuator, sensor, circuit) may be determined. For example, the fault may occur to sensing or control components of the system, such as a sensor assembly, a circuit assembly, a solenoid assembly, or an actuator assembly in the agricultural implement. Based on designs of the control system and types of fluid cylinder used in the agricultural implement, the disagreement between the pressure change and the position change may have various relationships, and the fault may have various types. Historical data stored in the system (e.g., the memory device) may be used to determine the correlation between the disagreement and the type of the fault.

Figure 2:
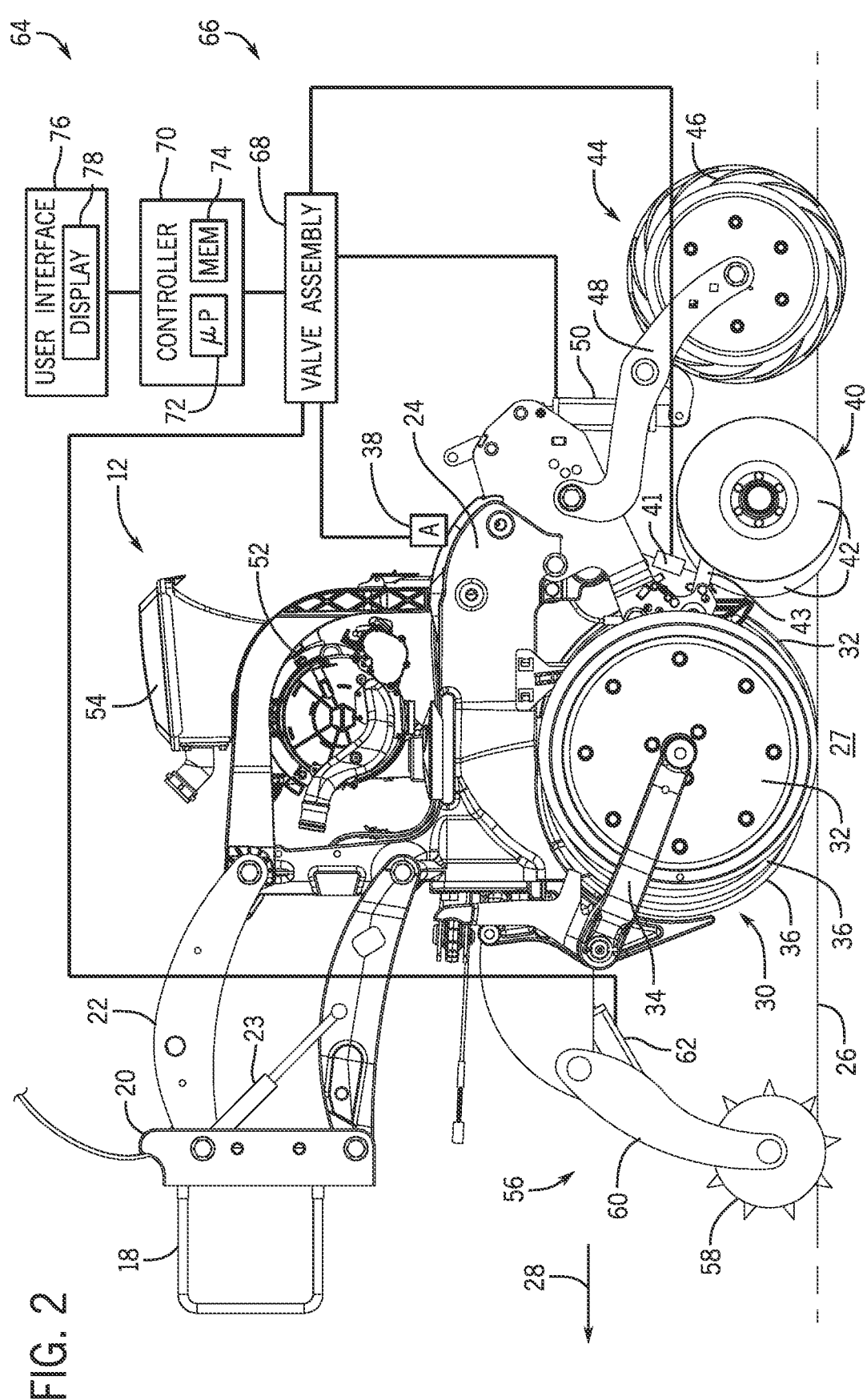
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a u-bolt that secures a bracket 20 of the row unit 12 to the tool bar. However, in other embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a surface 26 of the soil 27. In certain embodiments, a down pressure system 23 (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in other embodiments, another suitable linkage assembly may extend between the bracket and the frame.

The row unit 12 is configured to deposit seeds and/or other agricultural product(s) at a target depth beneath the soil surface 26 as the row unit 12 traverses a field along a direction of travel 28. The row unit 12 includes an opener assembly 30 that forms a trench in the soil 27 for seed/other agricultural product deposition into the soil. In the illustrated embodiment, the opener assembly 30 includes gauge wheels 32, arms 34 that pivotally couple the gauge wheels 32 to the frame 24, and opener disc blades 36. The opener disc blades 36 are configured to excavate a trench into the soil 27, and the gauge wheels 32 are configured to control a penetration depth of the opener disc blades 36 into the soil. In the illustrated embodiment, the row unit 12 includes a depth control actuator 38 configured to control the vertical position of the gauge wheels 32 (e.g., by blocking rotation of the arms in the upward direction beyond a selected orientation), thereby controlling the penetration depth of the opener disc blades 36 into the soil. The depth control actuator 38 may include any suitable type(s) of actuator(s) (e.g., hydraulic actuator(s), pneumatic actuator(s), electromechanical actuator(s), manual lever, manual knob, etc.), and the depth control actuator 38 may control the vertical position of the gauge wheels 32 via any suitable mechanical linkage (e.g., a linkage configured to block rotation of the arms 34 in the upward direction beyond a selected orientation that is controlled by the depth control actuator 38). While the illustrated opener assembly 30 includes two gauge wheels 32 and two opener disc blades 36 in the illustrated embodiment, in other embodiments, the opener assembly may include more or fewer gauge wheels (e.g., 0, 1, 3, or more) and/or more or fewer opener discs (e.g., 0, 1, 3, or more). For example, in certain embodiments, the gauge wheels may be omitted, and other suitable device(s) (e.g., skid(s), ski(s), etc.) may be used to control the penetration depth of the opener disc blade(s) into the soil. Furthermore, in certain embodiments, the opener discs may be omitted, and other suitable opener(s) (e.g., shank(s), knife/knives, etc.) may be used to form the trench within the soil.

The row unit 12 also includes an agricultural product conveying system (e.g., seed tube or powered agricultural product conveyor) configured to deposit seeds and/or other agricultural product(s) (e.g., fertilizer) into the trench. The opener assembly 30 and the agricultural product conveying system are followed by a closing assembly 40 that moves displaced soil back into the trench. In the illustrated embodiment, the closing assembly 40 includes two closing discs 42. However, in other embodiments, the closing assembly may include other suitable closing device(s) (e.g., a single closing disc, etc.). In the illustrated embodiment, the closing assembly 40 includes a fluid cylinder 41 (e.g., double-acting air cylinder, etc.) extending between the frame 24 of the row unit 12 and an arm 43 of the closing assembly 40. As illustrated, the arm 43 is pivotally coupled to the frame 24, and the fluid cylinder 41 is configured to control a force applied by the closing disc(s) 42 to the soil 27. Furthermore, while the fluid cylinder 41 extends to the arm 43 of the closing assembly 40 in the illustrated embodiment, in other embodiments, the fluid cylinder may extend to any suitable portion of the closing assembly (e.g., in embodiments in which the arm is omitted), such as to a hub of the closing disc(s). In addition, in certain embodiments, the closing assembly, including the closing disc(s), the arm, and the fluid cylinder, may be omitted.

In the illustrated embodiment, the closing assembly 40 is followed by a packing assembly 44 configured to pack soil on top of the deposited seeds and/or other agricultural product(s). The packing assembly 44 includes a packer wheel 46, an arm 48 that pivotally couples the packer wheel 46 to the frame 24, and a fluid cylinder 50 (e.g., double-acting air cylinder, etc.) configured to control a force applied by the packer wheel 46 to the soil surface 26, thereby enabling the packer wheel to pack soil on top of the deposited seeds and/or other agricultural product(s). As illustrated, the fluid cylinder 50 extends between the frame 24 of the row unit 12 and the arm 48 of the packing assembly 44. However, in other embodiments, the fluid cylinder may extend to any other suitable portion of the packer assembly, such as to a hub of the packer wheel. While the packing assembly 44 includes a single packer wheel 46 in the illustrated embodiment, in other embodiments, the packing assembly may include one or more additional packer wheels (e.g., arranged in a tandem configuration). Furthermore, in certain embodiments, the packing assembly, including the packer wheel, the arm, and the double-acting air cylinder, may be omitted.

The row unit 12 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in other embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 12 also includes a residue management assembly 56 having one or more residue management wheels 58. As illustrated, the residue management assembly 56 is positioned in front of the opener assembly 30 relative to the direction of travel 28, thereby enabling the residue management wheel(s) 58 to break up and/or displace residue and debris (e.g., clods) on the surface 26 of the soil before the opener disc blade(s) 36 engage the soil 27. In the illustrated embodiment, the residue management wheel(s) 58 are rotatably coupled to an arm 60, and the arm 60 is pivotally coupled to the frame 24 of the row unit 12. In addition, the residue management assembly 56 includes a fluid cylinder 62 (e.g., double-acting air cylinder, etc.) extending between the arm 60 and the frame 24 of the row unit 12. The fluid cylinder 62 is configured to control a force applied by the residue management wheel(s) 58 to the soil 27. While the fluid cylinder 62 extends between the frame 24 of the row unit 12 and the arm 60 of the residue management assembly 56 in the illustrated embodiment, in other embodiments, the fluid cylinder may extend to any other suitable portion of the residue management assembly, such as to a hub of the residue management wheel(s). Furthermore, in certain embodiments, the residue management assembly, including the residue management wheel(s), the arm, and the fluid cylinder, may be omitted.

In the illustrated embodiment, the agricultural implement (e.g., planting implement, planter) includes a control system 64 for the fluid cylinders. The control system 64 and the fluid cylinders form a fluid system 66 of the agricultural implement. As discussed in detail below, the control system 64 may control the fluid pressure within certain fluid cylinder(s) (e.g., the closing assembly fluid cylinder 41, the packing assembly fluid cylinder 50, the residue management assembly fluid cylinder 62, or a combination thereof) to control the force applied by the respective ground-engaging tool(s) to the soil. Additionally or alternatively, the control system 64 may control a valve assembly 68 to control the fluid volume within certain fluid cylinder(s) (e.g., the fluid cylinder associated with the depth control actuator 38) to control the position of the respective ground-engaging tool(s) (e.g., the gauge wheels 32).

In the illustrated embodiment, the control system 64 includes the valve assembly 68 fluidly coupled to the closing assembly fluid cylinder 41, to the packing assembly fluid cylinder 50, to the residue management assembly fluid cylinder 62, and to the fluid cylinder associated with the depth control actuator 38. The valve assembly 68 is configured to control the fluid pressure within certain fluid cylinder(s) (e.g., the closing assembly fluid cylinder 41, the packing assembly fluid cylinder 50, the residue management assembly fluid cylinder 62, or a combination thereof). Accordingly, the valve assembly 68 may control the force applied by each fluid cylinder to the respective ground engaging tool. The valve assembly 68 may also be configured to control the fluid volume within certain fluid cylinder(s) (e.g., the fluid cylinder associated with the depth control actuator 38). Accordingly, the valve assembly 68 may control the position of the respective ground engaging tool.

In addition, the control system 64 includes a controller 70 communicatively coupled to the valve assembly 68. In certain embodiments, the controller 70 is an electronic controller having electrical circuitry configured to control the valve assembly 68. In the illustrated embodiment, the controller 70 includes a processor 72, such as the illustrated microprocessor, and a memory device 74. The controller 70 may also include one or more storage devices and/or other suitable components. The processor 72 may be used to execute software, such as software for controlling the valve assembly, and so forth. Moreover, the processor 72 may include multiple microprocessors, one or more "general-purpose" microprocessors, one or more special-purpose microprocessors, and/or one or more application specific integrated circuits (ASICs), or some combination thereof. For example, the processor 72 may include one or more reduced instruction set (RISC) processors.

The memory device 74 may include a volatile memory, such as random access memory (RAM), and/or a nonvolatile memory, such as read-only memory (ROM). The memory device 74 may store a variety of information and may be used for various purposes. For example, the memory device 74 may store processor-executable instructions (e.g., firmware or software) for the processor 72 to execute, such as instructions for controlling the valve assembly 68, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the valve assembly 68, etc.), and any other suitable data.

Furthermore, in the illustrated embodiment, the control system 64 includes a user interface 76 communicatively coupled to the controller 70. The user interface 76 may include any suitable input device(s) configured to receive input from an operator, such as button(s), switch(es), knob(s), a keyboard, a mouse, other suitable input device(s), or a combination thereof. In the illustrated embodiment, the user interface 76 includes a display configured to present visual information to the operator. In certain embodiments, the display includes a touch screen interface configured to receive input from the operator. In addition, the user interface may include other suitable device(s) configured to present visual and/or audible information to the operator, such as indicator light(s), gauge(s), speaker(s), other suitable output device(s), or a combination thereof.

In certain embodiments, the control system 64 may be configured to control each fluid cylinder of the agricultural implement. However, in other embodiments, the agricultural implement may include multiple control systems 64, and each control system may be configured to control the fluid cylinder(s) of a respective row unit, a respective group of row units, or a respective type of ground-engaging tool (e.g., closing disc(s), packer wheel(s), residue management wheel(s), etc.) across multiple row units. Furthermore, while double-acting air cylinders are disclosed as controlling the force applied by the closing disc(s), the packer wheel(s), and the residue management wheel(s) to the soil in the illustrated embodiment, in other embodiments, the force applied by at least one of the ground-engaging tools may be controlled by other suitable fluid cylinder(s) (e.g., alone or in combination with the double-acting air cylinder), such as other suitable air cylinder(s) (e.g., single-acting air cylinder(s), etc.), hydraulic cylinder(s) (e.g., single-acting hydraulic cylinder(s), double-acting hydraulic cylinder(s), etc.), other suitable type(s) of fluid cylinder(s), or a combination thereof. In addition, in certain embodiments, other suitable type(s) of actuator(s) may be used to control the force applied by at least one ground-engaging tool to the soil (e.g., alone or in combination with the fluid cylinder(s)), such as airbag(s), hydraulic motor(s), pneumatic motor(s), electromechanical actuator(s), other suitable type(s) of actuator(s), or a combination thereof. Moreover, while double-acting air cylinders are disclosed as controlling the position of respective ground-engaging tool (e.g., vertical position of the gauge wheels 32), in other embodiments, a position of at least one of the ground-engaging tools may be controlled by other suitable fluid cylinder(s) (e.g., alone or in combination with the double-acting air cylinder), such as other suitable air cylinder(s) (e.g., single-acting air cylinder(s), etc.), hydraulic cylinder(s) (e.g., single-acting hydraulic cylinder(s), double-acting hydraulic cylinder(s), etc.), other suitable type(s) of fluid cylinder(s), or a combination thereof. In addition, in certain embodiments, other suitable type(s) of actuator(s) may be used to control the position of at least one ground-engaging tool (e.g., alone or in combination with the fluid cylinder(s)), such as airbag(s), hydraulic motor(s), pneumatic motor(s), electromechanical actuator(s), other suitable type(s) of actuator(s), or a combination thereof. While the fluid system is employed within a planting implement/planter in the illustrated embodiment, in other embodiments, the fluid system (e.g., including the control system and the fluid cylinder(s)) may be utilized within other suitable agricultural implements (e.g., seeding implements/seeders, tillage implements, etc.).

Figure 3:
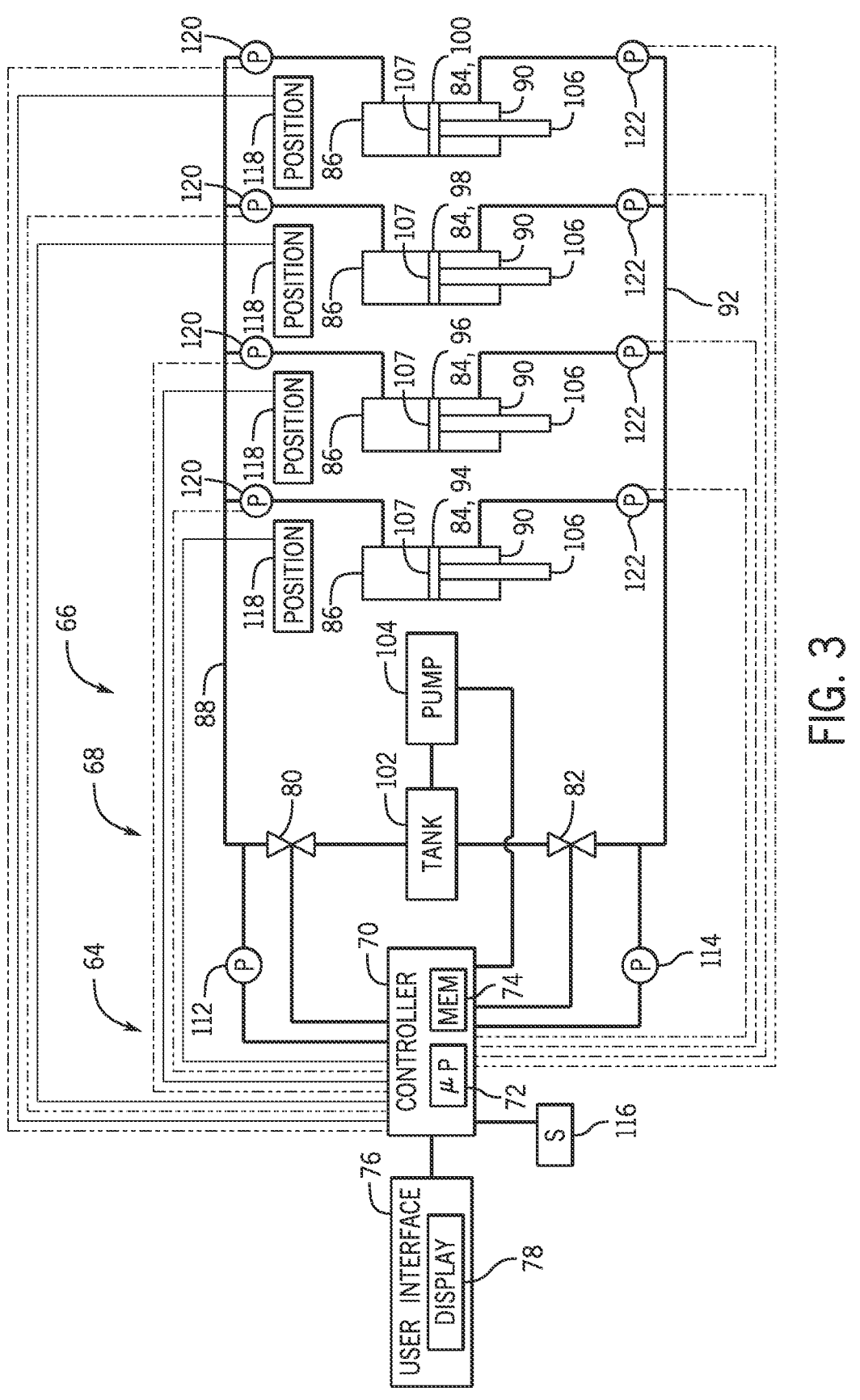
FIG. 3 is a schematic diagram of an embodiment of a fluid system that may be employed within the agricultural implement of FIG. 1.

FIG. 3 is a schematic diagram of an embodiment of a fluid system 66 that may be employed within the agricultural implement of FIG. 1. As previously discussed, the fluid system 66 includes the control system 64 and the fluid cylinder(s). Furthermore, as previously discussed, the control system 64 includes the valve assembly 68, the controller 70, and the user interface 76. In the illustrated embodiment, the valve assembly 68 includes a base end control valve 80 and a rod end control valve 82, the base end control valve 80 and the rod end control valve 82 are communicatively coupled to the controller 70, and the base end control valve 80 and the rod end control valve 82 are fluidly coupled to multiple double-acting air cylinders 84. As illustrated, the base end control valve 80 is fluidly coupled to the base ends 86 of the double-acting air cylinders 84 by base end conduits 88, and the rod end control valve 82 is fluidly coupled to the rod ends 90 of the double-acting air cylinders 84 by rod end conduits 92.

In the illustrated embodiment, the fluid system 66 includes four double-acting air cylinders 84 fluidly coupled to the valve assembly 68 in a parallel arrangement. Each double-acting air cylinder 84 may correspond to one of the fluid cylinders disclosed above, such as the closing assembly fluid cylinder, the packing assembly fluid cylinder, or the residue management assembly fluid cylinder, and each double-acting air cylinder 84 may be disposed on a different row unit. For example, a first double-acting air cylinder 94 may correspond to a residue management assembly double-acting air cylinder of a first row unit, a second double-acting air cylinder 96 may correspond to a residue management assembly double-acting air cylinder of a second row unit, a third double-acting air cylinder 98 may correspond to a residue management assembly double-acting air cylinder of a third row unit, and a fourth double-acting air cylinder 100 may correspond to a residue management assembly double-acting air cylinder of a fourth row unit. Because the double-acting air cylinders 84 are fluidly coupled in a parallel arrangement, the control valves of the valve assembly 68 (e.g., base end control valve 80, rod end control valve 82) may control the double-acting air cylinders 84 collectively. While the fluid system 66 includes four double-acting air cylinders 84 fluidly coupled to the control valves in a parallel arrangement in the illustrated embodiment, in other embodiments, the fluid system may include more or fewer double-acting air cylinders (e.g., 1, 2, 3, 5, 6, or more) fluidly coupled to the control valves in a parallel arrangement (e.g., one double-acting air cylinder for each row unit).

Furthermore, while the fluid system 66 includes a single set of control valves within the valve assembly 68 and a single set of double-acting air cylinders 84 in the illustrated embodiment, in other embodiments, the fluid system may include multiple sets of control valves (e.g., in which each set of control valves includes a respective base end control valve and a respective rod end control valve) within the valve assembly and multiple respective sets of double-acting air cylinders (e.g., in which each set of double-acting air cylinders includes 1, 2, 3, 4, 5, 6, or more double-acting air cylinders) fluidly coupled to the sets of control valves. For example, in certain embodiments, the fluid system may include a first set of control valves/double-acting air cylinders for the closing disc assembly/assemblies, a second set of control valves/double-acting air cylinders for the packing assembly/assemblies, a third set of control valves/double-acting air cylinders for the residue management assembly/assemblies, a fourth set of control valves/double-acting air cylinders for the depth control actuator, a fifth set of control valves/double-acting air cylinders for other suitable ground engaging tool(s), or a combination thereof. The double-acting air cylinders within each set of double-acting air cylinders may be fluidly coupled in a parallel arrangement and disposed on separate row units, as disclosed above, to facilitate collective control of the respective ground-engaging tools. Because each set of double-acting air cylinders is fluidly coupled to a respective set of control valves of the valve assembly, the controller may independently control each set of double-acting air cylinders.

In the illustrated embodiment, the fluid system 66 includes an air tank 102 and an air pump 104 fluidly coupled to the air tank 102. The air pump 104 is configured to provide the air tank 102 with pressurized air, and the air tank 102 is configured to provide the pressurized air to the double-acting air cylinders 84. As illustrated, the base end control valve 80 and the rod end control valve 82 are fluidly coupled to the air tank 102 and configured to receive pressurized air from the air tank 102. The base end control valve 80 is configured to control air flow from the air tank 102 to the base ends 86 of the double-acting air cylinders 84, and the rod end control valve 82 is configured to control air flow from the air tank 102 to the rod ends 90 of the double-acting air cylinders 84. In the illustrated embodiment, the air pump 104 is communicatively coupled to the controller 70, and the controller 70 is configured to control the output of the air pump 104. For example, the controller 70 may control the air pump 104 (e.g., by selectively engaging the air pump 104) such that the air pressure within the air tank 102 remains above a threshold pressure (e.g., a pressure suitable for operation of the double-acting air cylinders 84). While the fluid system 66 includes an air tank 102 in the illustrated embodiment, in other embodiments, the air tank may be omitted, and the air pump may provide the pressurized air directly to the control valves.

Furthermore, the base end control valve 80 is configured to control air flow from the base ends 86 of the double-acting air cylinders 84 to the atmosphere, and the rod end control valve 82 is configured to control air flow from the rod ends 90 of the double-acting air cylinders 84 to the atmosphere. For example, to decrease the air pressure within the base ends 86 of the double-acting air cylinders 84, the base end control valve 80 may vent air within the base ends 86 of the double-acting air cylinders 84 to the atmosphere. In addition, to decrease the air pressure within the rod ends 90 of the double-acting air cylinders 84, the rod end control valve 82 may vent air within the rod ends 90 of the double-acting air cylinders 84 to the atmosphere. While a single base end control valve controls airflow into and out of the base ends of the double-acting air cylinders in the illustrated embodiment, in other embodiments, the valve assembly may include a first base end control valve configured to control airflow into the base ends of the double-acting air cylinders and a second base end control valve configured to control airflow out of the base ends of the double-acting air cylinders. In addition, while a single rod end control valve controls airflow into and out of the rod ends of the double-acting air cylinders in the illustrated embodiment, in other embodiments, the valve assembly may include a first rod end control valve configured to control airflow into the rod ends of the double-acting air cylinders and a second rod end control valve configured to control airflow out of the rod ends of the double-acting air cylinders.

The control system 64 is configured to control the force applied by each double-acting air cylinder 84 by controlling the pressure within the base ends 86 and the rod ends 90 of the double-acting air cylinders 84. For example, to urge a piston rod 106 of each double-acting air cylinder 84 to extend, the controller 78 may control the base end control valve 80 and the rod end control valve 82 such that the base end air pressure within the base end 86 of each double-acting air cylinder 84 is greater than the rod end air pressure within the rod end 90 of the double-acting air cylinder 84. In addition, to urge the piston rod 106 of each double-acting air cylinder 84 to retract, the controller 78 may control the base end control valve 80 and the rod end control valve 82 such that the rod end air pressure within the rod end 90 of each double-acting air cylinder 84 is greater than the base end air pressure within the base end 86 of the double-acting air cylinder 84. Moreover, the extension or retraction of the piston rod 106 of a double-acting air cylinder 84 may change the air volume inside the respective double-acting air cylinder 84, which may cause a change in the air pressure within the respective double-acting air cylinder 84. For example, when the piston rod 106 extends (e.g., urged by an external force) to the base end 86, the air volume inside the respective double-acting air cylinder 84 decreases and the air pressure within the respective double-acting air cylinder 84 may increase. In addition, when the piston rod 106 retracts (e.g., urged by an external force) to the rod end 90, the air volume inside the respective double-acting air cylinder 84 increases and the air pressure within the respective double-acting air cylinder 84 may decrease.

The control system 64 may also be configured to control the position change applied by each double-acting air cylinder 84 (e.g., associated with the depth control actuator 38 to control the vertical position of the gauge wheels 32) by controlling the position of the piston rods of the corresponding double-acting air cylinders 84. For example, the control system 64 may control the position of the piston rod 106 by extending or retracting the piston rod 106, which may control the depth control actuator 38 to control the vertical position of the gauge wheels 32 via any suitable mechanical linkage (e.g., a linkage configured to block rotation of the arms 34 in the upward direction beyond a selected orientation that is controlled by the depth control actuator 38). Because the double-acting air cylinders 84 are fluidly coupled to the control valves in the parallel arrangement, as disclosed above, movement of one piston rod 106 in response to an external force or an external position change may drive fluid flow through the base end conduits 88 and the rod end conduits 92. For example, contact between a ground-engaging tool and an obstruction within the field may drive the piston rod 106 of the respective double-acting air cylinder 84 to move, thereby driving fluid flow through the conduits. A position change of a ground-engaging tool (e.g., the gauge wheels 32) may also drive the piston rod 106 of the corresponding double-acting air cylinder 84 (e.g., associated with the depth control actuator 38) to move, thereby driving fluid flow through the conduits.

In the illustrated embodiment, the control system 64 includes a first pressure sensor 112 and a second pressure sensor 114. As illustrated, the first and second pressure sensors are communicatively coupled to the controller 70. The first pressure sensor 112 is configured to output a first sensor signal indicative of the base end air pressure within the base ends 86 of the double-acting air cylinders 84, and the second pressure sensor 114 is configured to output a second sensor signal indicative of the rod end air pressure within the rod ends 90 of the double-acting air cylinders 84. The controller may utilize the feedback from the pressure sensors to control the base end air pressure within the base ends 86 of the double-acting air cylinders 84 and the rod end air pressure within the rod ends 90 of the double-acting air cylinders 84.

The controller 70 is configured to determine a target base end air pressure within the base end(s) 86 and a target rod end air pressure within the rod end(s) 90 of the double-acting air cylinder(s) 84 based on a target force of the double-acting air cylinder(s) 84. The target force of the double-acting air cylinder(s) 84 may be determined based on a target force of the ground-engaging tool coupled to each double-acting air cylinder (e.g., the target force applied by the ground-engaging tool to the soil). For example, if the target force of the ground-engaging tool is greater than the weight of the ground-engaging tool and any arm(s) that couple the ground-engaging tool to the frame of the row unit, the target force of the double-acting air cylinder may be in a downward direction (e.g., downforce). However, if the target force of the ground-engaging tool is less than the weight of the ground-engaging tool and any arm(s) that couple the ground-engaging tool to the frame of the row unit, the target force of the double-acting air cylinder may be in an upward direction (e.g., up-force).

In certain embodiments, the user interface 76 is configured to output a signal indicative of the target force of the double-acting air cylinder(s), and the controller 70 is configured to receive the signal from the user interface. For example, the signal indicative of the target force from the user interface may be indicative of a target contact force between the ground-engaging tool and the soil, and the controller may determine the target force of the double-acting air cylinder based on the target contact force between the ground-engaging tool and the soil (e.g., based on the weight of the ground-engaging tool and any arm(s) that couple the ground-engaging tool to the frame of the row unit). Additionally or alternatively, the controller may receive signal(s) indicative of the target force of the double-acting air cylinder from another suitable device/system (e.g., a remote control system, etc.).

Furthermore, in certain embodiments, the controller 70 may determine the target force of the double-acting air cylinder(s) based on feedback from one or more sensors 116 (e.g., soil sensor(s), residue monitoring sensor(s), position sensor(s), speed sensor(s), etc.) communicatively coupled to the controller 70. For example, the sensor may output a sensor signal indicative of one or more properties of the agricultural implement (e.g., position, speed, etc.) and/or one or more properties of the agricultural field in which the agricultural implement is located (e.g., soil density, soil moisture, soil composition, terrain roughness, residue density, etc.). In certain embodiments, with regard to controlling the residue management wheel(s), the controller may determine the target force based on sensor feedback indicative of residue density. Additionally or alternatively, with regard to controlling the packer wheel, the controller may determine the target force based on sensor feedback indicative of soil hardness. Furthermore, in certain embodiments, the controller may determine the target force based on sensor feedback indicative of a position of the implement/row unit within a field (e.g., by using one or more maps of the field, such as a soil density map, a residue density map, a terrain map, a soil moisture map, other suitable map(s), or a combination thereof).

Once the controller determines the target base end air pressure within the base end 86 and the target rod end air pressure within the rod end 90 of the double-acting air cylinder 84 based on the target force of the double-acting air cylinder 84, the controller may control the valve assembly 68 such that a difference between the base end air pressure (e.g., as measured by the first pressure sensor 112) and the target base end air pressure is less than a first threshold value and a difference between the rod end air pressure (e.g., as measured by the second pressure sensor 114) and the target rod end air pressure is less than a second threshold value. For example, the controller 70 may control the base end control valve 80 such that the difference between the base end air pressure and the target base end air pressure is less than the first threshold value, and the controller 70 may control the rod end control valve 80 such that the difference between the rod end air pressure and the target rod end air pressure is less than the second threshold value.

In the illustrated embodiment, the controller 70 may utilize feedback from the pressure sensors to determine the base end air pressure and the rod end air pressure. For example, the controller may determine the base end air pressure within the base end 86 of the double-acting air cylinder 84 based on feedback from the first pressure sensor 112, and the controller may determine the rod end air pressure within the rod end 90 of the double-acting air cylinder 84 based on feedback from the second pressure sensor 114. However, in certain embodiments, the controller may adjust the base end air pressure and the rod end air pressure via open loop control of the valve assembly 68 (e.g., the pressure sensors 112, 114 may be omitted). Each threshold value may be any suitable pressure difference (e.g., represented as a pressure or a percentage). For example, at least one threshold value may be a pressure difference of less than 10 percent, less than 5 percent, less than 2 percent, less than 1 percent, or less than 0.5 percent. Furthermore, the first and second threshold values may be the same as one another or different than one another.

In some embodiments, when there is a fault (e.g., inaccurate or ineffective operation of pressure sensor(s) and/or valve(s) of the valve assembly), the air pressure inside the double-acting air cylinder 84 may not correspond to an expected air pressure based on movement of the piston rod 106. As described above, the double-acting air cylinder controls the force applied by the respective ground-engaging tool to the soil. In addition, a position change of the corresponding piston rod may cause a change in the air pressure inside the double-acting air cylinder, and a change in the air pressure inside the double-acting air cylinder may cause a change in position of the piston rod. For example, contact between a ground-engaging tool and an obstruction within the field may drive the piston rod 106 of the respective double-acting air cylinder 84 to move, thereby changing the base end air pressure within the corresponding base end 86 and changing the rod end air pressure within the corresponding rod end 90. When the feedback from the corresponding pressure sensor(s) (e.g., the first pressure sensor 112 and/or the second pressure sensor 114) shows no changes in the air pressure(s) (e.g., the rod end air pressure and/or the base end air pressure), but feedback from a corresponding position sensor shows a position change of the piston rod, the controller may determine that a fault occurred (e.g., due to inaccurate or ineffective operation of the pressure sensor(s) and/or the position sensor). The controller may monitor feedback from the sensors and detect the disagreement between feedback from the pressure and position sensors to identify faults. Both the occurrences of the faults and the types of the faults (e.g., depending on the manner of disagreement between pressure and position) may be determined. The manner of disagreement may include magnitude of difference between measured pressure/position data and expected pressure/position data, rate of change, etc. In response to detecting a threshold number of occurrences of faults, the controller may output a fault message to notify the operator (e.g., via the user interface) or other controller(s) of the vehicle/implement, which may take corresponding mitigating action(s). The fault information (e.g., occurrence of the fault, number of fault occurrences, types of the faults, manners of disagreement between pressure and position, etc.) may be stored (e.g., in the controller memory). Accordingly, a positional feedback from a position sensor for a corresponding double acting air cylinder piston rod may be used to detect faults associated with either the sensing or control components of the fluid system.

In the illustrated embodiment, the control system 64 includes position sensors 118. Each position sensor 118 is configured to monitor a position of the piston rod 106 of a respective double-acting air cylinder 84, as illustrated in FIG. 3. Each double-acting air cylinder 84 is configured to apply a respective force to a respective ground-engaging tool (e.g., gauge wheel(s)) of the agricultural implement to control the operation of the agricultural implement (e.g., control the penetration depth of the opener discs into the soil). Accordingly, the signal from the position sensor 118 is indicative of the position of the respective ground-engaging tool, which is indicative of an operation status of the agricultural implement (e.g., the penetration depth of the opener discs into the soil). As described above, the position change of the piston rod 106 is associated with the difference between the base end air pressure within the base end 86 and the rod end air pressure within the rod end 90. Accordingly, when there is a change in the position of the piston rod 106, there may be an expected change in the air pressures within the base end 86 and the rod end 90. Therefore, the position feedback from the position sensor 118 may indicate changes in the air pressure in the base end 86 and/or the rod end 90. For example, when the controller identifies a position change of the piston rod based on feedback from the corresponding position sensor 118 with no indication of expected pressure change based on the position change of the piston rod from the corresponding pressure sensors (e.g., the first pressure sensor 112 and/or the second pressure sensor 114), the controller may detect a fault. In addition, as described above, when the piston rod 106 is urged by an external force (e.g. contact between a ground-engaging tool and an obstruction within the field) to move, the pressure sensors may register a coinciding increase or decrease in pressure under normal operating conditions, which may cause the air volume inside the respective double-acting air cylinder 84 decrease or increase and thus extend or retract the piston rod 106. Accordingly, when there is a change in the air pressures within the base end 86 and the rod end 90, there may be an expected change in the position of the piston rod 106. Therefore, the pressure feedback from the pressure sensors (e.g., the first pressure sensor 112 and/or the second pressure sensor 114) may indicate changes in the position of the piston rod 106. For example, when the controller identifies a pressure change within the base end 86 and/or the rod end 90 with no indication of coinciding expected position change of the piston rod 106 from the corresponding positon sensors (e.g., the position sensor 118), the controller may detect a fault.

As discussed above, the relationship between the pressure change and the position change may vary based on types of agricultural implements, types of fluid cylinders, types of actuators, circuits of the control system, etc. The relationship may be represented by a corresponding threshold range of the expected pressure change or position change based on corresponding position change or pressure change. For example, if the position change is not within a threshold range of the expected positon change based on the pressure change, or if the pressure change is not within a threshold range of the expected pressure change based on the position change, the controller may detect a fault. The controller may receive pressure signal(s) and/or position signal(s) may from respective pressure sensors (e.g., the first pressure sensors 112 and/or the second pressure sensors 114) and/or position sensors (e.g., the position sensors 118), and the controller may determine a pressure change and/or a position change for a certain period based on the pressure signal(s) and/or the position signal(s). Then the controller may compare the pressure change with an expected pressure change based on the position change, and/or compare the position change with an expected position change based on the pressure change. When the pressure change is not within the corresponding threshold range of the expected pressure change based on the position change, or when the position change is not within the corresponding threshold range of the expected position change based on the pressure change, or a combination thereof, the controller may detect a fault.

While double-acting air cylinders are described above in the fluid system 66, the fluid system 66 may include other suitable fluid cylinder(s) (e.g., alone or in combination with the double-acting air cylinder), such as other suitable air cylinder(s) (e.g., single-acting air cylinder(s), etc.), hydraulic cylinder(s) (e.g., single-acting hydraulic cylinder(s), double-acting hydraulic cylinder(s), etc.), other suitable type(s) of fluid cylinder(s), or a combination thereof. For example, in some embodiments, the fluid system 66 may include a single-acting air cylinder. When the control valve(s) are closed in the single-acting air cylinder, the fluid system has a fixed volume of air, which is monitored by pressure sensors as part of the control feedback. If a sudden extension or retraction of the piston rod occurs, which may be detected by a position sensor, the pressure sensors may register a coinciding increase or decrease in pressure under normal operating conditions. The relationship of coupling between these two types of sensors (position and pressure) are related to the fixed volume of air. Therefore, the controller may use the relationship to detect abnormal behavior of the system to identify a position sensor fault, a pressure sensor fault, a circuit fault, or a valve fault. For example, when the controller detects an extension or retraction of the piston rod but no corresponding coinciding increase or decrease in pressure, the controller may identify a position sensor fault, a pressure sensor fault, a circuit fault, a valve fault, or a combination thereof.

As illustrated in FIG. 3, each position sensor 118 is communicatively coupled to the controller 70. Each position sensor 118 is configured to output a sensor signal indicative of the position of the corresponding piston rod 106 of the respective double-acting air cylinder 84, which may be indicative of the position of the corresponding ground-engaging tool. The controller 70 is configured to determine the position of the piston rod 106 based on the sensor signal received from the position sensor 118, which may be used to determine an operation status of the agricultural implement (e.g., the penetration depth of the opener discs into the soil). The controller 70 is configured to monitor the sensor signal from the position sensor 118 and the sensor signals from the pressure sensors 112 and 114. In addition, the controller 70 is configured to identify instances of disagreement between the position feedback (indicated by the position sensor signal) and the pressure feedback (indicated by the pressure sensor signals). The controller 70 may monitor the occurrence(s) of the disagreement(s) over a time period. The controller 70 may determine the type of fault (e.g., valve, position sensor, pressure sensor, circuit, etc.) based on the manner of disagreement between the pressure and position sensors. The controller 70 may store the fault information (e.g., fault occurrence(s), fault type, number of fault occurrences, etc.). For example, fault codes may indicate different types of faults related to manners of disagreement between the pressure and position sensors. The fault information may be communicated to notify the operator or other vehicle/ implement controller(s), and corresponding mitigating action(s) may be taken accordingly.

As illustrated in FIG. 3, in the fluid system 66, the base ends 86 of the four double-acting air cylinders 84 are fluidly coupled together via the base end conduits 88, and the rod ends 90 of the four double-acting air cylinders 84 are fluidly coupled together via the rod end conduits 92. In the illustrated embodiment, the first pressure sensor 112 is configured to output a first sensor signal indicative of the base end air pressure within the base ends 86 of all the four double-acting air cylinders 84, and the second pressure sensor 114 is configured to output a second sensor signal indicative of the rod end air pressure within the rod ends 90 of all the four double-acting air cylinders 84. Consequently, when there is a position change of the piston rod 106 of one of the four double-acting air cylinders 84, the associated air pressure changes may be applied to all the other three double-acting air cylinders 84 via the base end conduits 88 and the rod end conduits 92. That is, the double-acting air cylinders 84 may interact with each other via the common base end conduits 88 and the common rod end conduits 92.

Accordingly, in some embodiments, measurements of the air pressures may be obtained using a respective base pressure sensor 120 and a respective rod pressure sensor 122 for each double-acting air cylinder 84, as illustrated in FIG. 3. As illustrated in FIG. 3, the base pressure sensors 120 and rod pressure sensors 122 are communicatively coupled to the controller 70. Each base pressure sensor 120 is configured to output a respective base sensor signal indicative of the base end air pressure within the base end 86 of the corresponding double-acting air cylinder 84, and each rod pressure sensor 122 is configured to output a respective rod sensor signal indicative of the rod end air pressure within the rod end 90 of the corresponding double-acting air cylinder 84. The controller 70 may utilize the feedback from the respective pressure sensors 120 and 122 to control the base end air pressure within the base end 86 of the corresponding double-acting air cylinder 84 and the rod end air pressure within the rod end 90 of the corresponding double-acting air cylinder 84. As described above, the double-acting air cylinder controls the force applied by the respective ground-engaging tool to the soil. In addition, as described above, a position change of the corresponding piston rod may cause a change in the air pressure inside the double-acting air cylinder, and a change in the air pressure inside the double-acting air cylinder may cause a change in position of the piston rod. For example, contact between a ground-engaging tool and an obstruction within the field may drive the piston rod 106 of the respective double-acting air cylinder 84 to move, thereby changing the base end air pressure within the corresponding base end 86 and changing the rod end air pressure within the corresponding rod end 90. When the feedback from the corresponding pressure sensor(s) (e.g., the base pressure sensor 120 and/or the rod pressure sensor 122) shows no changes in the air pressure(s) (e.g., the rod end air pressure and/or the base end air pressure), but feedback from a corresponding position sensor shows a position change of the piston rod, the controller may determine that a fault occurred (e.g., due to inaccurate or ineffective operation of the pressure sensor(s) and/or the position sensor). The controller may monitor feedback from the sensors and detect the disagreement between feedback from the pressure and position sensors to identify faults. Both the occurrences of the faults and the types of the faults (e.g., depending on the manner of disagreement between pressure and position) may be determined. The manner of disagreement may include magnitude of difference between measured pressure/position data and expected pressure/position data, rate of change, etc. In response to detecting a threshold number of occurrences of faults, the controller may output a fault message to notify the operator (e.g., via the user interface) or other controller(s) of the vehicle/implement, which may take corresponding mitigating action(s). The fault information (e.g., occurrence of the fault, number of fault occurrences, types of the faults, manners of disagreement between pressure and position, etc.) may be stored (e.g., in the controller memory). Because each double-acting air cylinder 84 is monitored by an individual base end pressure sensor 120 and an individual rod end pressure sensor 122, a measurement may be obtained by the controller 70 regarding pressure changes in each of the double-acting air cylinders 84. In certain embodiments, at least a portion of the pressure sensors 120/122 may be omitted.

In certain embodiments, the controller may independently control each double-acting air cylinder (or each set of double-acting air cylinders) by using the respective set of control valves to maintain desired position(s) of respective ground-engaging tool(s). With regard to each ground-engaging tool, the controller may utilize the feedback from the corresponding position sensor 118 and the corresponding pressure sensors 120 and 122 to monitor/control operation of the respective double-acting air cylinder, and thus monitor/ control operation of the ground-engaging tool. For example, the depth control actuator 38 may include a double-acting air cylinder 84, and contact between the opener disc blades 36 of the gauge wheel 32 and an obstruction within the field may urge the piston rod 106 of the respective double-acting air cylinder 84 to move, thereby changing the base end air pressure within the corresponding base end 86 and changing the rod end air pressure within the corresponding rod end 90. When the feedback from the corresponding pressure sensor(s) (e.g., the base pressure sensor 120 and/or the rod pressure sensor 122) shows no changes in the air pressure(s) (e.g., the rod end air pressure and/or the base end air pressure), but feedback from a corresponding position sensor (e.g. the position sensor 118) shows a position change of the piston rod, the controller may determine that a fault occurred (e.g., due to inaccurate or ineffective operation of the pressure sensor(s) and/or the position sensor). Because each double-acting air cylinder 84 is controlled by using the respective set of control valves to maintain desired position(s) of respective ground-engaging tool(s), the controller 70 may control the operation of the gauge wheel 32 by controlling the corresponding set of control valves based on the feedback from the corresponding position sensor 118. For example, the controller 70 may control the In certain embodiments, at least a portion of the respective set of control valves may be omitted.

While control of a single double-acting air cylinder is disclosed above for simplicity/clarity, the control system may control each double-acting air cylinder within the illustrated parallel arrangement. In some embodiments, the fluid cylinders could be arrange in series or a combination of series and parallel. While double-acting air cylinders are described above in the fluid system, the fluid system may include other suitable fluid cylinder(s) (e.g., alone or in combination with the double-acting air cylinder), such as other suitable air cylinder(s) (e.g., single-acting air cylinder(s), etc.), hydraulic cylinder(s) (e.g., single-acting hydraulic cylinder(s), double-acting hydraulic cylinder(s), etc.), other suitable type(s) of fluid cylinder(s), or a combination thereof. Furthermore, the process of controlling the air pressure within the double-acting air cylinders disclosed above may apply to each set of control valves/double-acting air cylinders. In addition, while double-acting air cylinders are disclosed herein, the process of controlling air pressure may be applied to opposing air cylinders (e.g., in which the pistons are coupled to one another, and the air pressure within the base ends is controlled) or to opposing air bags (e.g., in which the air pressure within each air bag is controlled).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for an agricultural implement, comprising:
   a position sensor configured to monitor a position of a piston rod of a fluid cylinder, wherein the fluid cylinder is configured to apply a force to a ground-engaging tool of the agricultural implement via the piston rod;
   a pressure sensor configured to monitor a fluid pressure inside the fluid cylinder; and
   a controller communicatively coupled to the position sensor and to the pressure sensor, wherein the controller comprises a memory and a processor, and the controller is configured to:
      receive a position signal from the position sensor;
      receive a pressure signal from the pressure sensor;
      determine a position change of the piston rod based on the position signal during a certain period of time;
      determine an expected pressure change based on the position change;

determine a pressure change of the fluid pressure inside the fluid cylinder based on the pressure signal during the certain period of time;
      determine an expected position change based on the pressure change;
      compare the position change to the expected position change;
      compare the pressure change to the expected pressure change; and
      identify a fault in response to determining the position change is not within a first threshold range of the expected position change, or determining the pressure change is not within a second threshold range of the expected pressure change, or a combination thereof.

2. The control system of claim 1, wherein the controller is configured to:
   in response to determining the position change is not within a first threshold range of the expected position change, identify a first fault type for the fault; and
   in response to determining the pressure change is not within a second threshold range of the expected pressure change, identify a second fault type for the fault.

3. The control system of claim 2, wherein the controller is configured to store a first occurrence for the first fault type and a second occurrence for the second fault type during a time period.

4. The control system of claim 1, wherein the controller is configured to output a notice in response to determining a number of occurrences of the fault is greater than a threshold value.

5. The control system of claim 1, wherein the controller is configured to control the fluid pressure inside the fluid cylinder via a control valve fluidly coupled to the fluid cylinder based on the position signal, the pressure signal, or a combination thereof.

6. The control system of claim 1, wherein the ground-engaging tool comprises a gauge wheel configured to control a penetration depth of a disc blade into soil.

7. The control system of claim 6, wherein the controller is configured to determine the penetration depth of the disc blade into the soil based on the position signal received from the position sensor.

8. A control system for an agricultural implement, comprising:
   a plurality of position sensors, wherein each of the plurality of position sensors is configured to monitor a respective position of a respective piston rod associated with a respective fluid cylinder of a plurality of fluid cylinders, wherein the respective fluid cylinder of the plurality of fluid cylinders is configured to apply a respective force to a respective ground-engaging tool of the agricultural implement via the respective piston rod;
   a plurality of pressure sensors, wherein each pressure sensor of the plurality of pressure sensors is configured to monitor a respective fluid pressure inside the respective fluid cylinder of the plurality of fluid cylinders; and
   a controller communicatively coupled to the plurality of position sensors and the plurality of pressure sensors, wherein the controller comprises a memory and a processor, and for each fluid cylinder of the plurality of fluid cylinders, the controller is configured to:
      receive a respective position signal from each position sensor of the plurality of position sensors;
      receive a respective pressure signal from each pressure sensor of the plurality of pressure sensors;

determine a respective position change of the respective piston rod based on the respective position signal during a certain period of time;

determine a respective expected pressure change based on the respective position change;

determine a respective pressure change of the respective fluid pressure inside the respective fluid cylinder based on the respective pressure signal during the certain period of time;

determine a respective expected position change based on the respective pressure change;

compare the respective position change to the respective expected position change;

compare the respective pressure change to the respective expected pressure change; and identify a respective fault in response to determining the respective position change is not within a first respective threshold range of the respective expected position change, or determining the respective pressure change is not within a second respective threshold range of the respective expected pressure change, or a combination thereof.

9. The control system of claim 8, wherein for each fluid cylinder of the plurality of fluid cylinders, the controller is configured to:

in response to determining the respective position change is not within a first respective threshold range of the respective expected position change, identify a first fault type for the respective fault; and in response to determining the respective pressure change is not within a second respective threshold range of the respective expected pressure change, identify a second fault type for the respective fault.

10. The control system of claim 9, wherein for each fluid cylinder of the plurality of fluid cylinders, the controller is configured to store a first respective occurrence for the first fault type of the respective fault and a second respective occurrence for the second fault type of the respective fault during a time period.

11. The control system of claim 8, wherein the controller is configured to output a notice in response to determining a respective number of occurrences of the respective fault is greater than a threshold value.

12. The control system of claim 8, wherein each respective ground-engaging tool of the agricultural implement comprises a respective gauge wheel configured to control a respective penetration depth of a respective disc blade into soil.

13. The control system of claim 12, wherein for each fluid cylinder of the plurality of fluid cylinders, the controller is configured to determine the respective penetration depth of the respective disc blade into the soil based on the respective position signal received from the respective position sensor.

14. A method for controlling an agricultural implement, comprising:

receiving a position signal from a position sensor, wherein the position sensor is configured to monitor a position of a piston rod of a fluid cylinder, wherein the fluid cylinder is configured to apply a force to a ground-engaging tool of the agricultural implement via the piston rod;

receiving a pressure signal from a pressure sensor configured to monitor a fluid pressure inside the fluid cylinder;

determining a position change of the piston rod based on the position signal during a certain period of time;

determining an expected pressure change based on the position change;

determining a pressure change of the fluid pressure inside the fluid cylinder based on the pressure signal during the certain period of time;

determining an expected position change based on the pressure change;

comparing the position change to the expected position change;

comparing the pressure change to the expected pressure change; and identifying a fault in response to determining the position change is not within a first threshold range of the expected position change, or determining the pressure change is not within a second threshold range of the expected pressure change, or a combination thereof.

15. The method of claim 14, comprising:

in response to determining the position change is not within a first threshold range of the expected position change, identifying a first fault type for the fault; and in response to determining the pressure change is not within a second threshold range of the expected pressure change, identifying a second fault type for the fault.

16. The method of claim 15, comprising storing a first occurrence for the first fault type and a second occurrence for the second fault type during a time period.

17. The method of claim 14, comprising outputting a notice in response to determining a number of occurrences of the fault is greater than a threshold value.

18. The method of claim 14, comprising controlling the fluid pressure inside the fluid cylinder via a control valve fluidly coupled to the fluid cylinder based on the position signal, the pressure signal, or a combination thereof.

19. The method of claim 14, wherein the ground-engaging tool comprises a gauge wheel configured to control a penetration depth of a disc blade into soil.

20. The method of claim 19, wherein the penetration depth of the disc blade into the soil is determined based on the position signal received from the position sensor.

* * * * *